(12) United States Patent
Ecklund et al.

(10) Patent No.: US 6,473,606 B1
(45) Date of Patent: Oct. 29, 2002

(54) COMMON INTERMEDIATE FREQUENCY BROADCAST RADIO FRONT END

(75) Inventors: Lawrence Marvin Ecklund, Wheaton, IL (US); Gregory J. Buchwald, Crystal Lake, IL (US); Kenneth S. Hutchinson, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/441,249

(22) Filed: Nov. 16, 1999

(51) Int. Cl.$^7$ ................................................. H04B 1/26
(52) U.S. Cl. ...................................... 455/314; 455/142
(58) Field of Search ................................. 455/142, 143, 455/144, 188.1, 189.1, 190.1, 313, 314, 315, 326, 333, 552, 553

(56) References Cited

U.S. PATENT DOCUMENTS

| | | | | |
|---|---|---|---|---|
| 3,665,507 A | * | 5/1972 | Peil | 455/142 |
| 4,050,022 A | * | 9/1977 | McFadyen et al. | 455/143 |
| 4,135,158 A | * | 1/1979 | Parmet | 455/143 |
| 4,160,955 A | * | 7/1979 | Sato | 455/142 |
| 4,688,263 A | * | 8/1987 | Aldridge | 455/189.1 |
| 5,020,147 A | * | 5/1991 | Okanobu | 455/143 |
| 5,239,699 A | * | 8/1993 | Ecklund | 455/142 |

* cited by examiner

*Primary Examiner*—Nay Maung
*Assistant Examiner*—Quochien B. Vuong
(74) *Attorney, Agent, or Firm*—Robert L. King

(57) ABSTRACT

A common intermediate frequency broadcast radio front end. The invention employs a common front end that employs a common mixer and intermediate frequency for both AM and FM radio signals. Borrowing on the inherent advantages of employing a substantially reduced intermediate frequency, when compared to the elevated intermediate frequency that is employed in many conventional systems, the invention provides for the ability to employ components whose precision is significantly relaxed and whose cost is substantially reduced. The low frequency affords the ability to use relatively cheap ceramic filters and integrated filters within the IC instead of relatively expensive crystal filters commonly employed at higher intermediate frequencies. In addition, the implementation of a common mixer for both AM and FM signals results in a savings of real estate on the silicon die used to operate certain embodiments of the invention.

16 Claims, 2 Drawing Sheets

COMMON INTERMEDIATE FREQUENCY BROADCAST RADIO FRONT END

FIELD OF THE INVENTION

The present invention relates generally to broadcast radios; and, more particularly, it relates to broadcast radios employing a common front-end circuitry that is operable for multiple operating modes including both frequency modulation (FM) and amplitude modulation (AM) modes.

BACKGROUND OF THE INVENTION

Conventional broadcast radios that employ a common intermediate frequency to both amplitude modulation (AM) and frequency modulation (FM) signals typically operate at a high intermediate center frequency. For example, certain conventional broadcast radios employing a common intermediate frequency operate substantially at 10.7 MHz. This high frequency operation is desired for FM signal processing, in discrete format because relatively cheap, ceramic filters, and coils are available for processing FM signals. Relatively expensive crystal filters are required for AM signal processing at these high frequencies. While the perceptual quality and performance of the AM signal processing is still achievable at high intermediate frequencies, there is an associated penalty in cost. Further, for integrated solutions, this cost is due to, among other things, the high precision required for components to perform AM signal processing on the silicon die.

There is desirability in using a common intermediate frequency broadcast radio front end, but many of the advantages gained in using a common front end are outweighed by the associated penalties to be paid in required component precision and cost of the device. In addition, in an integrated solution, the signal to noise ratio is difficult to maintain while operating at an elevated intermediate. Those having skill in the art of signal processing will appreciate the difficulty of performing precision signal processing at such elevated frequency ranges.

Further limitations and disadvantages of conventional and traditional systems will become apparent to one of skill in the art through comparison of such systems with the present invention as set forth in the remainder of the present application with reference to the drawings.

DETAILED DESCRIPTION OF THE DRAWINGS

The present invention provides for a common intermediate frequency for both amplitude modulation (AM) and frequency modulation (FM) radio signals. The common intermediate frequency is substantially reduced when compared to other conventional broadcast radios that employ a common intermediate frequency and mixer that is common to AM and FM radio signals. In certain embodiments of the invention, the common intermediate frequency substantially has a center frequency of approximately 450 kHz. This much reduced intermediate frequency, when compared to the common intermediate frequency of 10.7 MHz of conventional systems employing a common intermediate frequency for both AM and FM signals, provides an increased signal to noise ratio with implementation on an integrated circuit. In addition, the precision requirements for the components in an integrated solution of the filter and demodulator are significantly relaxed, borrowing on the substantially reduced intermediate frequency. The invention employs, in various embodiments of the invention, a common mixer for both AM and FM signals that reduces the real estate required which provides savings in cost. In addition, the fact that the intermediate frequency is at a substantially reduced frequency, when compared to conventional systems, provides for the continue use of low cost ceramic filtering as opposed to the crystal filtering that may be employed at elevated intermediate frequencies.

Figure 1:
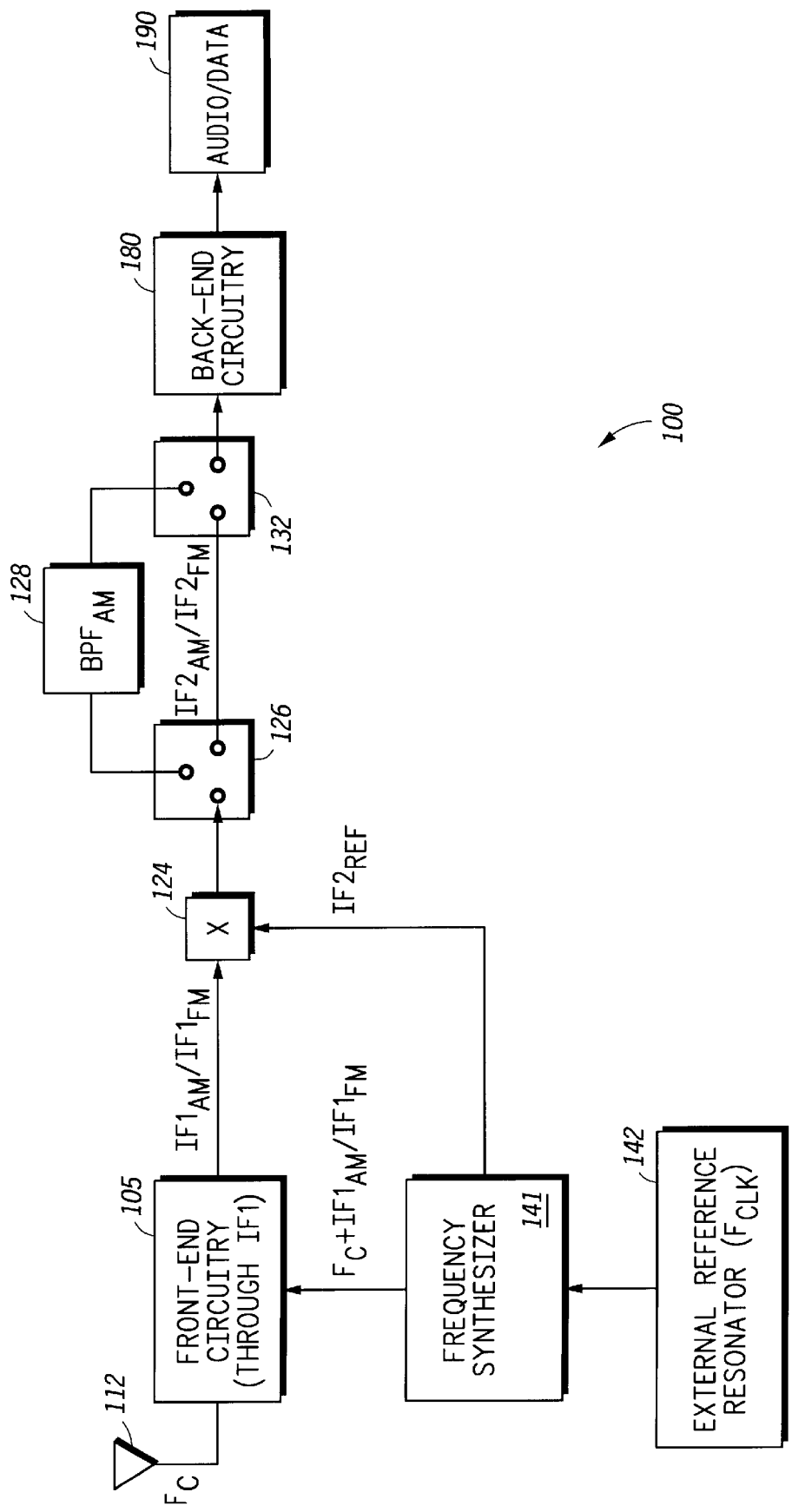
FIG. 1 is a system diagram illustrating one embodiment of a radio built in accordance with the present invention that employs common front-end circuitry that is operable for both amplitude modulation (AM) and frequency modulation (FM) radio signals.

FIG. 1 is a system diagram illustrating one embodiment of a radio 100 built in accordance with the present invention that employs a common front-end circuit that is operable for both amplitude modulation (AM) and frequency modulation (FM) radio signals. The radio 100 receives a radio signal using an antenna 112. The radio signal is provided from the antenna 112 to a common front end-circuitry 105 that is operable through a first intermediate frequency (IF1). The common front end-circuitry 105 is operable for both amplitude modulation (AM) and frequency modulation (FM) radio signals. An external reference resonator ($F_{CLK}$) 142 provides a reference clock signal to a frequency synthesizer 141. In certain embodiments of the invention, the frequency synthesizer 141 performs modification of the clock signal that is provided from the external reference resonator ($F_{CLK}$) 142. Various forms of modification that are performed to the clock signal using the frequency synthesizer 141 include, but are not limited to, generating the desired mixer frequencies from a common reference and is passed to the front end-circuitry 105 and to a common mixer 124 that is operable for both AM and FM radio signals.

An interface circuitry communicatively couples the front-end circuitry 105 to a back-end circuitry 180. The interface circuitry itself contains, among other things, a first switch 126 and a second switch 132. The first switch 126 and the second switch 132 are cooperatively operable to employ a bandpass filter ($BPF_{AM}$) 128 that is operable to perform band pass filtering on the radio signal that is received by the antenna 112 when the radio 100 is operating in an AM receiving mode. That is to say, the first switch 126 and the second switch 132 are cooperatively operable to employ the bandpass filter ($BPF_{AM}$) 128 when the radio signal received using the antenna 112 is an AM radio signal. When the radio 100 is operating in an FM receiving mode, the first switch 126 and the second switch 132 operate to pass the radio signal straight from the common mixer 124 to a back-end circuitry 180. After having passed through the back-end circuitry 180, the radio 100 generates a plurality of audio/data output information 190.

Figure 2:
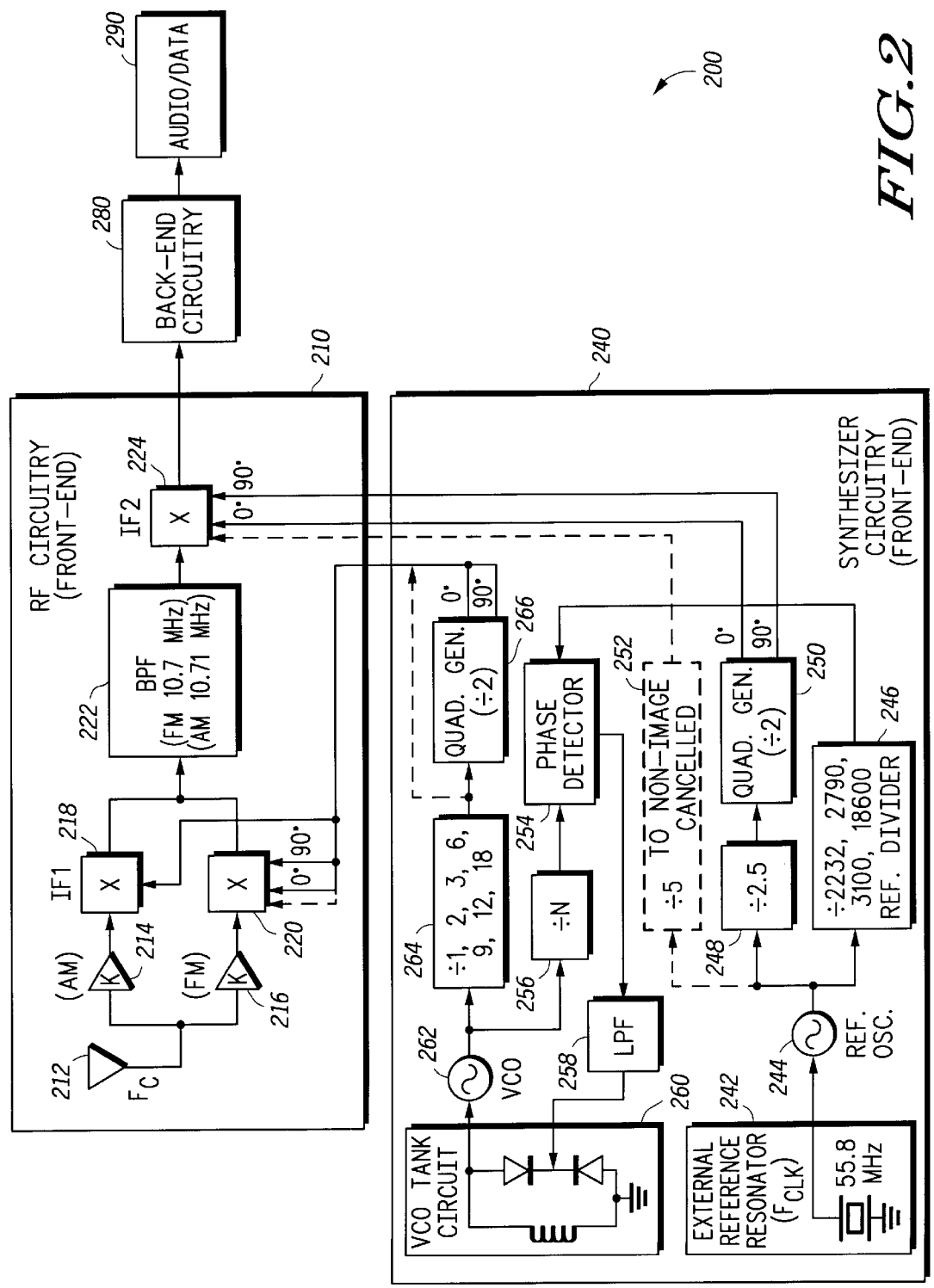
FIG. 2 is a system diagram illustrating one specific embodiment of a radio built in accordance with the radio of FIG. 1.

In certain embodiments of the invention, the plurality of audio/data output information 190 is transmitted to speakers for audible reproduction of the radio signal that is received using the antenna 112 in a form that is substantially perceptually indistinguishable from the signal being encoded and transmitted before it is received using the radio 100 using the antenna 112. FIG. 2 is a system diagram illustrating one specific embodiment of a radio 200 built in accordance with the radio 100 of FIG. 1. The radio 200 itself contains, among other things, a radio frequency (front-end) circuit 210, synthesizer (front-end) circuitry 240, and a back-end circuit 280. The radio 200 receives a radio signal using an antenna 212 that is contained within the radio frequency (front-end) circuitry 210. After the radio 200 has performed signal processing on the radio signal that is received using the antenna 212, and after it has been passed through to the back-end circuitry 280, the radio 200 generates a plurality of audio/data output information 190.

Depending on whether the radio 200 is operating in an amplitude modulation (AM) mode or a frequency modulation (FM) mode, the radio signal is passed to either an amplifier (AM) 214 or an amplifier (FM) 216, respectively. Two mixers are provided within the radio frequency (front-end) circuit 210, one for each of the amplitude modulation (AM) mode and the frequency modulation (FM) mode. An amplitude modulation (AM) mixer 218 is operable on the radio signal when the radio is receiving an amplitude modulation (AM) radio signal. Conversely, a frequency modulation (FM) mixer 220 is operable on the radio signal when the radio is receiving a frequency modulation (FM) radio signal. Each of the amplitude modulation (AM) mixer 218 and the frequency modulation (FM) mixer 220 receives control signals from the synthesizer (front-end) circuitry 240 to perform the appropriate mixing of the radio signal at a first intermediate frequency (IF1). In certain embodiments of the invention, the first intermediate frequency (IF1) that is provided to the radio frequency (front-end) circuitry 210 contains a center frequency that is substantially 10.7 MHz in the frequency modulation (FM) mode and substantially 10.71 MHz in the amplitude modulation (AM) mode. After the radio signal has passed through either the amplitude modulation (AM) mixer 218 or the frequency modulation (FM) mixer 220, it is passed through a bandpass filter (BPF) 222 that is operable to filter the radio signal that has been transferred to the first intermediate frequency (IF1), substantially 10.7 MHz when operating in the frequency modulation (FM) mode and substantially 10.71 MHz when operating in the amplitude modulation (AM) mode. In certain embodiments of the invention, the control signals that are provided to the frequency modulation (FM) mixer 220 by the synthesizer (front-end) circuitry 240 are control signals for both an in-phase and a quadrature signal.

Subsequently, after passing through the bandpass filter (BPF) 222, the signal is passed to a common mixer 224. Similar to the control signals that are provided from the synthesizer (front-end) circuitry 240 to perform the appropriate mixing of the radio signal at a first intermediate frequency (IF1), control signals are also provided from the synthesizer (front-end) circuitry 240 to perform the appropriate mixing of the radio signal at a second intermediate frequency (IF2) within the common mixer 224. In certain embodiments of the invention, the control signals provided to the common mixer 224 by the synthesizer (front-end) circuitry 240 are control signals for both an in-phase and a quadrature signal and the control signals assist the common mixer 224 to perform image cancellation. Alternatively, in other embodiments of the invention, the control signals provided to the common mixer 224 by the synthesizer (front-end) circuitry 240 is a control signal for embodiments of the invention that does not perform image cancellation. Subsequently, after the radio signal has been passed through the common mixer 224 and is passed to the back-end circuitry 280 for additional signal processing, the radio 200 provides the plurality of audio/data output information 190.

The mixing performed by the common mixer 224 is at a second intermediate frequency (IF2), substantially 460 kHz when operating in the frequency modulation (FM) mode and substantially 450 kHz when operating in the amplitude modulation (AM) mode. In certain embodiments of the invention, the control signals that are provided to the common mixer 224 by the synthesizer (front-end) circuitry 240 are control signals for both an in-phase and a quadrature signal.

The synthesizer (front-end) circuitry 240 itself contains an external reference resonator 242 that provides an output clock signal that is fed to a reference oscillator 244($F_{CLK}$). The frequency of the clock signal has a center frequency that is substantially 55.8 MHz in certain embodiments of the invention. This center frequency that is substantially 55.8 MHz is amenable to subsequent frequency division to acquire various frequencies common in the art of radio signal processing. Depending upon the desired application of the synthesizer (front-end) circuitry 240, the signal provided from the reference oscillator 244 is divided using a number of various values before it is passed to the radio frequency (front-end) circuitry 210. The clock signal from the reference oscillator 244, is divided by five "5" before it is passed to the common mixer 224 of the radio frequency (front-end) circuitry 210. Depending on whether image cancellation is to be performed or not using the common mixer 224 of the radio frequency (front-end) circuit 210, the signal is first divided by "2.5" in a block 248 and then subsequently by "2" (for a total division by "5") for both in-phase and quadrature generation in a block 250. In this specific embodiment of the invention, the control signals provided by the block 250 are fed to the common mixer 224 of the radio frequency (front-end) circuitry 210. However, in certain embodiments of the invention, when image cancellation is not performed using the radio 200, the signal is divided by "5" in a block 252 before it is fed to the common mixer 224 of the radio frequency (front-end) circuitry 210. The signals provided from the synthesizer (front-end) circuitry 240 to the common mixer 224 of the radio frequency (front-end) circuitry 210 are for mixing to the second intermediate frequency (IF2), namely, substantially 460 kHz when operating in the frequency modulation (FM) mode and substantially 450 kHz when operating in the amplitude modulation (AM) mode. In addition, the clock signal from the reference oscillator 244, is divided by a reference divider 246. Depending on the specific embodiment, the division performed by the reference divider 246 is one of either "2232," "2790," "3100," and "18600." The signal provided from the reference divider 246 is provided to a phase locked loop that is employed within the synthesizer (front-end) circuitry 240. The signal output from the reference divider 246 is fed to a phase detector 254. Subsequently, the phase detector signal is passed to a low pass filter (LPF) 258. The output from the low pass filter (LPF) 258 is fed to a voltage controlled oscillator (VCO) tank circuit 260. The frequency of the voltage controlled oscillator tank circuit is determined by the signal from the LPF 258. The phase locked loop is closed when the signal output from the voltage controlled oscillator (VCO) 262 is subsequently divided using a divider 256 and fed into the second input of the phase detector 254. The phase locked loop is composed of the phase detector 254, the low pass filter (LPF) 258, the voltage controlled oscillator (VCO) tank circuit 260, the voltage controlled oscillator (VCO) 262, and the divider 256. The output from the phase locked loop is fed to a variable divider 264. Depending on the specific embodiment, the division performed by the variable divider 264 is one of either "1," "2," "3," "6," "9," "12," and "18." Subsequently, the signal is passed directly to the frequency modulation (FM) mixer 220 for embodiments of the invention that do not require in-phase and quadrature generation. One example of an embodiment of the invention that does not require in-phase and quadrature generation is that of operation within the VHF weather band. However, in other embodiments of the invention that require in-phase and quadrature operation, the signal is first passed through a quadrature generation divider 266 that divides the signal by "2" and then passes the signal to the frequency modulation (FM) mixer 220.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A radio receiver front end comprising:
    an AM mixer that mixes a received AM signal with a first selected center frequency signal in an AM receive mode to provide an intermediate AM signal;
    an FM mixer that mixes a received FM signal with a second selected center frequency signal in an FM receive mode to provide an intermediate FM signal;
    a bandpass filter having a predetermined frequency response that bandpass filters the first intermediate AM signal in the AM receive mode to provide a bandpass representation of the intermediate AM signal and that bandpass filters the first intermediate FM signal in the FM receive mode to provide a bandpass representation of the intermediate FM signal;
    a common mixer that selectively mixes, depending upon whether the receiver is in the AM receive mode or the FM receive mode, one of the bandpass representation of the intermediate FM signal and the bandpass representation of the intermediate AM signal with a fixed frequency to generate a signal of substantially 450 kHz in the AM mode and 460 kHz in the FM mode.

2. The radio receiver front end of claim 1 further comprising:
    a synthesizer that provides the predetermined center frequency by starting from a reference frequency of substantially 55.8 MHz.

3. The radio receiver front end of claim 2 wherein the synthesizer further comprises:
    an oscillator circuit that provides the reference frequency of substantially 55.8 MHz;
    a first frequency divider coupled to the oscillator circuit that divides the reference frequency by one of the following divisors: (1) 2232; (2) 2790; (3) 3100; and (4) 18,600;
    a phase locked loop coupled to the first frequency divider that provides a synthesizer signal that is phase locked with the divided frequency signal;
    a second frequency divider coupled to the phase locked loop that divides the synthesizer signal by one of the following divisors: (1) 1; (2) 2; (3) 3; (4) 6; (5) 9; (6) 12; and (7) 18; the second frequency divider providing the first and second center frequency signals; and
    a third frequency divider coupled to the oscillator circuit that divides the reference frequency by a predetermined factor to provide the predetermined center frequency to the common mixer.

4. The radio receiver front end of claim 3 wherein the third frequency divider provides divided reference signals to be used for image cancellation, the third frequency divider further comprising a quadrature generator to provide the fixed center frequency signal to the common mixer as two signals that have substantially ninety degrees of phase separation.

5. The radio receiver front end of claim 3 further comprising a quadrature generator coupled to an output of the second frequency divider circuit, the quadrature generator providing the first and second center frequency signals separated in phase from each other by substantially ninety degrees.

6. The radio receiver front end of claim 3 wherein the predetermined factor of the third frequency divider circuit is five.

7. The radio receiver front end of claim 1 wherein a frequency bandwidth of the FM signal must be at least twenty percent of the predetermined center frequency of substantially 460 kHz.

8. The radio receiver front end of claim 1 wherein the predetermined frequency response of the bandpass filter is characterized by a center frequency of substantially 10.7 MHz in the AM receive mode and a center frequency of substantially 10.71 MHz in the FM receive mode.

9. A method to receive and process AM and FM radio signals, comprising the steps of:
    selectively receiving one of an AM and an FM signal in response to the selection of an AM receiver mode and an FM receiver mode;
    mixing and bandpass filtering the AM and FM signals, the resultant signals having a first center frequency for FM signals and a second center frequency for AM signals that differs from the first center frequency, but which is passed through the same IF filter and in which the second center frequency is offset from the first center frequency by a fixed amount; and
    mixing the FM first center frequency and the AM second center frequency with a common signal resulting in a third center frequency for FM operation and a fourth center frequency for AM operation which are passed through the same path and which operate at a fixed offset.

10. The method of claim 9 wherein the third center frequency is approximately 460 kHz and the fourth center frequency is approximately 450 kHz.

11. The method of claim 9 further comprising the step of:
    generating the third center frequency and the fourth center frequency from a reference frequency generator that provides approximately a 55.8 MHz signal.

12. The method of claim 9 wherein the first center frequency and the second center frequency are generated from an oscillator that is phase locked utilizing a 55.8 MHz signal to provide a control signal that is divided by a factor of either 1, 2, 3, 6, 9, 12 or 18 to provide the first and second center frequencies.

13. A front end of an FM/AM radio receiver, comprising:
    a first mixer that mixes a received AM signal with a first signal when the receiver is selected to be in an AM receive mode;
    a second mixer that mixes a received FM signal with a second signal when the receiver is selected to be in an FM receive mode;
    a bandpass filter coupled to each of the first mixer and the second mixer that respectively bandpass filters outputs of the first mixer and the second mixer, the bandpass filter provides a filtered intermediate signal;
    a third mixer coupled to the bandpass filter, the same third mixer being used to process the filtered intermediate signal when the filtered intermediate signal has a frequency in either an AM frequency range or an FM frequency range; and
    a synthesizer circuit that provides a signal to produce a center frequency for the third mixer, the center frequency being substantially 450 kHz in the AM mode and substantially 460 kHz in the FM mode.

14. The front end of the FM/AM radio receiver of claim 13 wherein the synthesizer circuit provides the center frequency in response to a reference frequency oscillator that provides a substantially 55.8 MHz reference frequency.

15. The front end of the FM/AM radio receiver of claim 14 wherein the synthesizer circuit further comprises:
   a first frequency divider coupled to the reference frequency oscillator that provides a divided frequency signal by dividing the 55.8 MHz reference frequency by one of the following divisors: (1) 2232; (2) 2790; (3) 3100; or (4) 18,600;
   a phase locked loop coupled to the first frequency divider that provides a synthesizer signal that is phase locked with the divided frequency signal;
   a second frequency divider coupled to the phase locked loop that divides the synthesizer signal by one of the following divisors: (1) 1; (2) 2; (3) 3; (4) 6; (5) 9; (6) 12; or (7) 18; the second frequency divider providing center frequency signals to the first and second mixers; and
   a third frequency divider coupled to the oscillator circuit that divides the reference frequency by a predetermined factor to provide the predetermined center frequency to the third mixer.

16. The front end of the FM/AM radio receiver of claim 15 wherein the predetermined factor that the reference frequency is divided by the third frequency divider is one of substantially 2232, 2790, 3100 or 18600.

* * * * *